United States Patent [19]

Tsuji et al.

[11] Patent Number: 4,797,678
[45] Date of Patent: Jan. 10, 1989

[54] DEVICE FOR PREDICTING UNIQUE WORD DETECTION POSITIONS IN A TDMA STATION BY USING LATEST VALID DETECTION POSITIONS

[75] Inventors: Akira Tsuji; Haruki Takai, both of Tokyo, Japan

[73] Assignee: NEC Corporation, Japan

[21] Appl. No.: 744,377

[22] Filed: Jun. 13, 1985

[30] Foreign Application Priority Data

Jun. 14, 1984 [JP] Japan ............... 59-123199

[51] Int. Cl.⁴ .................................. H04B 7/185
[52] U.S. Cl. .................. 342/352; 370/105; 375/95; 375/113
[58] Field of Search ............ 343/352, 357; 342/352, 342/357; 455/38, 67, 181; 370/18, 82, 93, 94, 100, 101, 104, 105; 375/95, 113

[56] References Cited

U.S. PATENT DOCUMENTS

| | | | |
|---|---|---|---|
| 4,353,129 | 10/1982 | Nishiwaki | 370/102 X |
| 4,504,946 | 3/1985 | Raychaudhuri | 370/104 X |
| 4,561,099 | 12/1985 | Atsugi et al. | 370/104 X |
| 4,570,257 | 2/1986 | Olson et al. | 370/100 X |
| 4,574,379 | 3/1986 | Eng et al. | 370/104 |
| 4,577,316 | 3/1986 | Schiff | 370/104 |
| 4,594,708 | 6/1986 | Servel et al. | 370/100 X |
| 4,596,981 | 6/1986 | Ueno et al. | 370/100 X |
| 4,617,659 | 10/1986 | Chopping et al. | 370/100 |
| 4,622,665 | 11/1986 | Jonsson et al. | 370/100 |
| 4,630,267 | 12/1986 | Costes et al. | 370/104 |
| 4,635,247 | 1/1987 | Tejima | 370/104 X |
| 4,642,806 | 2/1987 | Hewitt et al. | 370/104 X |

Primary Examiner—Theodore M. Blum
Assistant Examiner—John B. Sotomayor
Attorney, Agent, or Firm—Ostrolenk, Faber, Gerb & Soffen

[57] ABSTRACT

One of patterns representative of instants along each TDMA frame is selected as a selected pattern in response to a unique word detection pulse produced in a current frame. With the unique word detection pulse used as a write pulse, a memory memorizes the selected pattern as a memorized pattern in a memory cell accessed by one of burst identifying flags which identify time slots in the current frame, respectively. The memorized pattern is produced as a read-out pattern when accessed by the burst identifying flag which corresponds in a next succeeding frame to the above-mentioned one burst identifying flag. A calculator produces offset representing patterns. Upon coincidence of each read-out pattern and one of the offset representing patterns, a comparator produces a receive position predicting pulse predictive of a position or a unique word detection window in the next succeeding frame. The write pulse is preferably obtained by giving the unique word detection pulse a delay which is equal to a predetermined fraction of each time slot. The offset representing patterns represent the respective instants plus an offset which is equal to a duration of each frame minus a half of a duration of each unique word detection window.

4 Claims, 2 Drawing Sheets

DEVICE FOR PREDICTING UNIQUE WORD DETECTION POSITIONS IN A TDMA STATION BY USING LATEST VALID DETECTION POSITIONS

BACKGROUND OF THE INVENTION

This invention relates to a receive position or instant predicting device for use in a receiving arrangement of an earth station of a time division multiple access (TDMA) satellite communication network.

In the manner known in the art of satellite communication, the network comprises a master station, other earth stations, and a satellite which is a geostationary satellite in general. Ordinarily, the master station is operable also like other earth stations.

At any rate, the master station perioridically sends reference bursts to a transponder carried by the satellite. A time interval called a TDMA frame, is defined at the transponder with reference to each reference burst. The TDMA frame, which will hereinafter be referred to simply as a frame and has a frame period or length, comprises a predetermined number of time slots which are allotted to the respective earth stations in compliance with a predetermined burst or channel plan.

Each earth station compresses traffic data and control signals into transmission bursts which have a common placement in the frame period. It will be assumed merely for brevity of description that the time slots have a common duration or length and that each transmission burst has a length defined by the common duration of the time slots. Controlled by transmission control information, the transmission bursts are sent to the transponder so as to be in alignment with the time slots assigned in the respective frames to the earth station under consideration. It is to be noted in this connection that the transmission bursts would not necessarily reach the transponder with the frame period exactly kept because the satellite has a position which inevitably fluctuates relative to the earth and because the transmission control information is unavoidably accompanied by error.

Each earth station receives the reference bursts through the transponder and establishes frame synchronism. Thereafter, the earth station receives the transmission bursts of other earth stations through the transponder as recepion bursts and decodes the reception bursts into decoded data. On receiving the reception bursts, it is necessary to detect a unique word (usually abbreviated to UW in the art) included in each reception burst.

The unique words have a predetermined unique word pattern. On detecting each unique word, signal patterns of the decoded data are compared with the unique word pattern. A certain portion of the signal patterns may, however, become similar to the unique word pattern due to noise. It is therefore mandatory to predict a range in each time slot and to regard that portion of the decoded data as the unique word which is detected in the range and has a signal pattern coincident with the unique word pattern. The range is called a unique word detection window.

Prediction of the unique word detection windows has been carried out, on the basis of the reception bursts which are received correctly or found valid in a current frame in view of the unique words included therein, for a next succeeding frame. The receive position predicting device is for producing a sequence of receive position predicting pulses predictive of starting edges of the respective unique word detection windows in the next succeeding frame as unique word detection positions or instants at which the respective unique words will be received and detected.

It will later be described more in detail that a conventional receive position predicting device produces the receive position predicting pulse sequence, in response to those unique word detection pulses of a sequence and those burst identifying flags of another sequence which are produced in the current frame, for the next succeeding frame. The burst identifying flags identify those time slots repeatedly in the frames in the known manner in which the reception bursts are received, respectively.

The conventional device comprises a plurality of receive position predicting circuits for the respective unique word detection pulses of each frame. Provision of such receive position predicting circuits is unavoidable because the reception bursts may not necessarily have exact positions or instants along the frame due to the above-described fact that the transmission bursts may not exactly reach the transponder. In other words, it is inevitable that the device comprises the receive position predicting circuits of a number which is equal to the number of reception bursts in each frame.

The conventional device is therefore bulky. When a new earth station is added to existing earth stations of the network, the receive position predicting circuits must be added to the respective devices of the existing earth stations. It is expensive to make in advance each device comprise the receive position predicting circuits of a great number in consideration of the number of earth stations which the network may comprise in future.

Moreover, the unique word detection positions are predicted with such a conventional device on the assumption such that all unique words are detected always without fail in the respective frames. It may, however, happen that detection of a unique word fails in a certain frame due to a temporary degradation in channel performance. This disables prediction of a unique word detection position in the next succeeding frame and furthermore in successively subsequent frames.

SUMMARY OF THE INVENTION

It is therefore an object of the present invention to provide a receive position predicting device which is for use in an earth station of a time division multiple access satellite communication network in predicting, in a current time division multiple access frame, a unique word detection position in a next succeeding time division multiple access frame and which is compact and inexpensive.

It is another object of this invention to provide a receive position predicting device of the type described, which is capable of predicting the unique word detection position even when a unique word is not duly detected in at least one time division multiple access frame.

A receive position predicting device to which this invention is applicable, is for use in a receiving arrangement of an earth station of a time division multiple access satellite communication network in predicting, in response to a sequence of burst identifying flags identifying those time slots repeatedly in time division multiple access frames at which bursts are received and in response to a unique word detection pulse indicative of detection of a unique word in a burst received as a reception burst in a current frame of the time division multiple access frames, a position of detection of the unique word in another burst which corresponds to the reception burst in a next succeeding frame of the time division multiple access frames. According to this invention, the device comprises: reference time information generating means for generating a sequence of reference time patterns representative of reference time information along each time division multiple access frame; event occurrence detecting means coupled to the reference time information generating means and responsive to the unique word detection pulse for detecting an instant of occurrence of the unique word detection pulse to produce one of the reference patterns as a selected pattern that represents the instant; memory means coupled to the event occurrence detecting means and responsive to the sequence of burst identifying flags used as an address signal and to the unique word detection pulse used as a write pulse for memorizing the selected pattern as a memorized pattern and responsive to the sequence of burst identifying flags of the next succeeding frame for producing the memorized pattern as a read-out pattern; calculating means coupled to the reference time information generating means for adding an offset amount to the reference time information represented by the respective reference patterns to produce a sequence of offset representing patterns representative of offset time information; and comparing means for comparing the read-out pattern with the offset representing patterns to produce a receive position predicting pulse predictive of the position of detection when the read-out pattern is coincident with one of the offset representing patterns.

DESCRIPTION OF THE PREFERRED EMBODIMENTS

Figure 1:
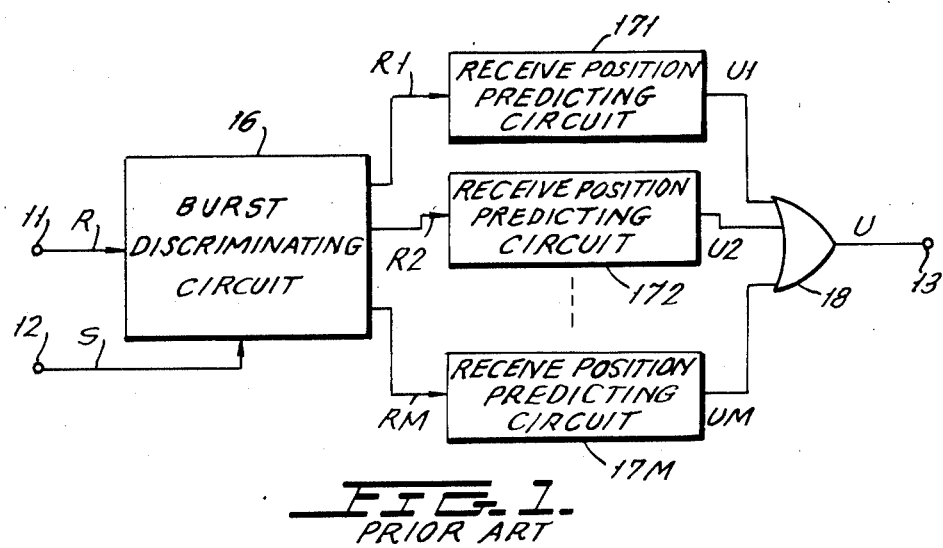
FIG. 1 is a block diagram of a conventional receive position predicting device.

Referring to FIG. 1, a conventional receive position predicting device will be described at first in order to facilitate an understanding of the present invention. The device is for use in a receiving arrangement of an earth station of a time division multiple access (TDMA) satellite communication network. Merely for convenience of description, one of the earth stations to which attention is directed will be called an earth station while other earth stations are called terrestrial stations. Insofar as the conventional device is concerned, it will be presumed that a unique word (UW) is always detected without fail in a burst received as a reception burst in each TDMA frame, which will hereinafter be referred to merely as a frame.

The device has first and second device input terminals 11 and 12 and a device output terminal 13. The input terminals 11 and 12 are supplied with a unique word detection pulse sequence R and a burst identifying flag sequence S, respectively, which are produced in the receiving arrangement. In a manner known in the art, the unique word detection pulses are indicative of detection of the unique words in the respective reception bursts in successive frames. The burst identifying flags identify those time slots repeatedly in the frames at which the reception bursts are and will be received. The device delivers a receive position predicting pulse sequence U to the output terminal 13. When the unique word detection pulses and the burst identifying flags of a current frame are used, the receive position predicting pulses are predictive of unique word detection positions or instants at which the unique words will be received and detected in a next succeeding frame and are used in the receiving arrangement in a known manner. It is possible to understand that the terminals 11 through 13 also indicate those portions of the receiving arrangement which produce the unique word detection pulse sequence R and the burst identifying flag sequence S and in which the receive position predicting pulse sequence U is used.

Figure 2:
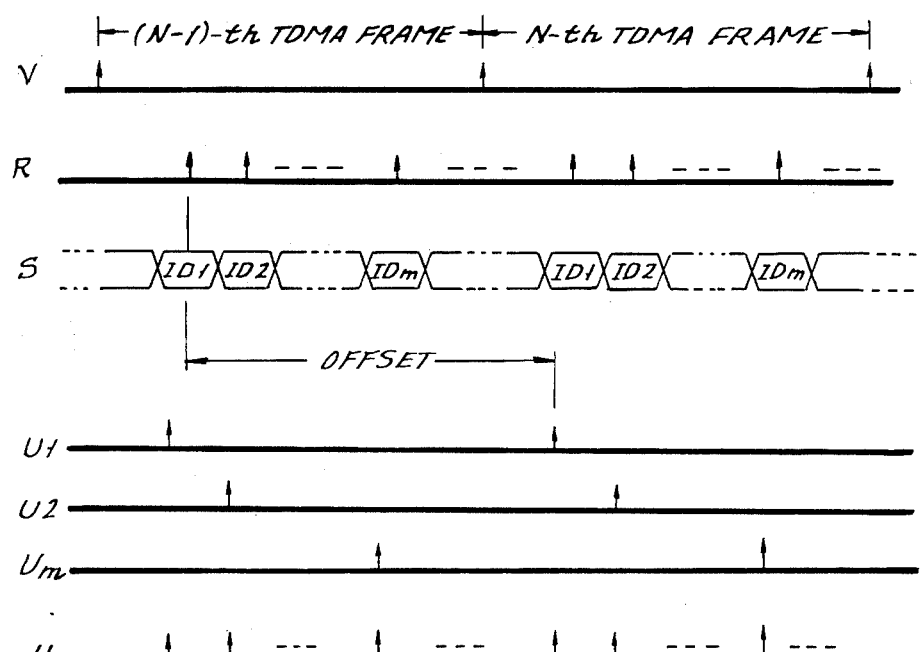
FIG. 2 is a time chart illustrative of signals used in the device depicted in FIG. 1.

Turning to FIG. 2 for a short while, a frame timing pulse sequence V is produced in the receiving arrangement to define the successive frames in a manner also known in the art. Along the top line, an $(N-1)$-th and an N-th frame are exemplified. When the $(N-1)$-th frame is the current frame, the N-th frame is the next succeeding frame. When the N-th frame is the current frame, the $(N-1)$-th frame is a next preceding frame. Each frame comprises first through M-th time slots (not shown). The time slots are allotted to the respective terrestrial stations. The reception bursts (not shown) are received in the respective time slots.

In the manner depitcted along a second line from the top, the unique word detection pulse sequence R consists of the above-described unique word detection pulses. Along a third line, the burst identifying flag sequence S consists of first, second, ..., m-th, and other burst identifying flags ID1, ID2, ..., IDm, and so forth identifying the reception bursts in the first, the second, ..., the m-th, and the like time slots in each frame.

Turning back to FIG. 1 and continuing reference to FIG. 2, it will now be assumed that the $(N-1)$-th frame is the current frame. In the manner presumed heretobefore, the unique word detection pulses R (the same reference letter being used) represent correct detection of the unique words in the respective reception bursts of the current frame. The device comprises a burst discriminating circuit 16 having first through M-th output ports in correspondence to the respective reception bursts of each frame. Responsive to the burst identifying flags IDm's of the sequence S, the burst discriminating circuit 16 discriminates the unique word detection pulses R and distributes them to the respective output ports as first through M-th unique word pulses R1, R2, ..., and RM. Sequences, M in number, of such unique word pulses are delivered to first through M-th receive position predicting circuits 171, 172, ..., and 17M, respectively.

Each receive position predicting circuit 17m comprises a counter (not shown) for giving the m-th unique word pulse Rm an amount of offset X. The offset amount X is determined so as to provide, based on each unique word pulse Rm, a position or instant where a starting edge is had by a unique word detection window for detection of the unique word of a reception burst which will be received in the m-th time slot of the next succeeding frame. The position or instant will herein be called an m-th receive position of the unique word. The offset amount X is given by:

$$X = L - (W/2),$$

where L and W represent the frame period and a predetermined duration or width of each unique word detection window.

The first through the M-th reference position predicting circuits 17 (suffixes omitted) thereby produce first through M-th receive position predicting pulses U1, U2, ..., and UM in the N-th frame, namely, in the next succeeding frame. An OR circuit 18 is for use in converting such parallel series of the first through the M-th receive position predicting pulses into a single sequence of receive position predicting pulses and in delivering the single sequence to the output terminal 13 as the receive position predicting pulse sequence U. Along fourth through sixth lines of FIG. 2, the first, the second, and the m-th receive position predicting pulses U1, U2, and Um are depicted also for the (N−1)-th frame. Along a seventh or the bottom line, the receive position predicting pulse sequence U is illustrated.

It will be understood that the conventional device must comprise the receive position predicting circuits 17 of a number which is equal to the number of reception bursts in each frame. In addition, it is already described before that the above-described assumption may not always be correct. Thus the conventional device does not invariably detect unique words without fail. The device therefore has defects pointed out hereinabove.

Figure 3:
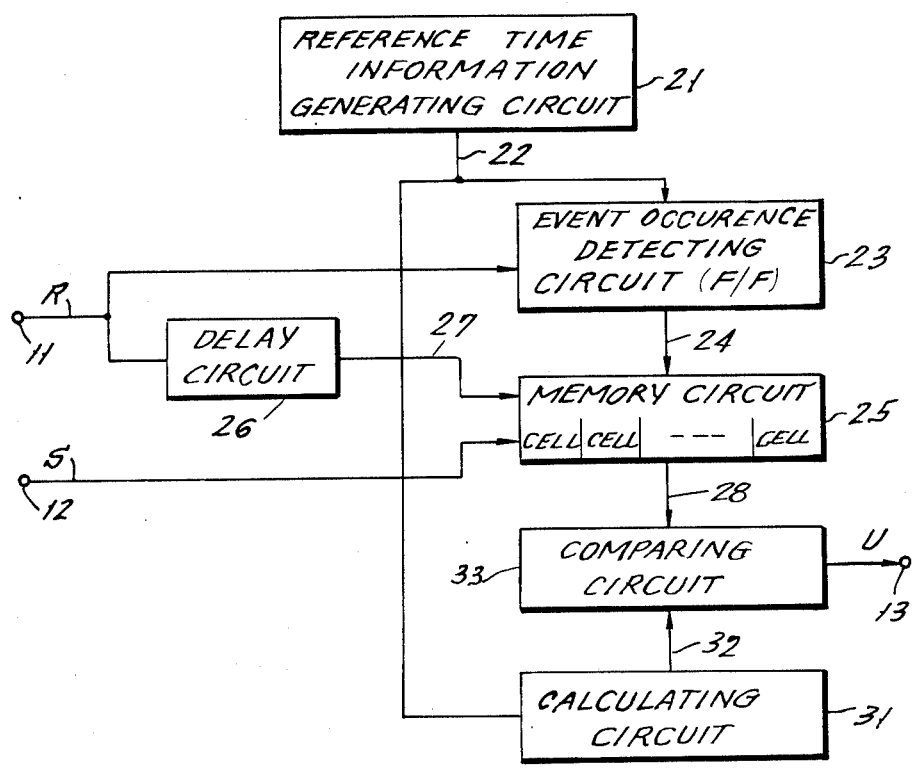
FIG. 3 is a block diagram of a receive position predicting device according to an embodiment of the instant invention.

Referring now to FIG. 3, description will proceed to a receive position predicting device according to an ambodiment of this invention. The device has first and second device input terminals 11 and 12 and a device output terminal 13 like the conventional device. The input terminals 11 and 12 are supplied with the unique word detection pulse sequence R and the burst identifying flag sequence S, respectively. The device delivers the receive position predicting pulse sequence U to the output terminal 13.

Although designated by the like reference letter R, at least one of the unique word detection pulses may not actually be produced in the manner discussed hereinabove because detection of the unique word may fail due to a temporary degradation in performance of a satellite communication channel for a burst which includes the unique word in question. Even in such an event, one of the unique word detection pulses is produced in compliance with detection of a unique word in a burst received in a time slot of one of the frames that will be referred to afresh as a current frame. Merely for brevity of description, the time slot will be called a specific time slot and the unique word detection pulse, a specific unique word detection pulse. The burst in which the unique word is duly detected to produce the specific unique word detection pulse, will be referred to anew as a reception burst.

In response to the specific unique word detection pulse and in a manner which will become clear as the description proceeds, the device produces a specific one of the receive position predicting pulses that predicts a unique word detection window in a time slot corresponding in the next succeeding frame to the specific time slot. Until another unique word detection pulse is produced in correspondence to the specific unique word prediction pulse in one of the next and other succesively subsequent frames, the device produces the specific receive position predicting pulses repeatedly with reference to the specific unique word detection pulse. That one of the next succeeding and the successively subsequent frames will be called a subsequent frame.

All unique word detection pulses of the sequence R will be produced in a plurality of successive frames. In response to the burst identifying flag sequence S and based on each of such unique word detection pulses that was produced latest in the successive frames, all receive position predicting pulses of the sequence U are eventually produced in each of the frames of the type of the above-defined subsequent frame.

A reference time information generating circuit 21 generates a sequence 22 of reference patterns representative of reference time information or of instants along each frame. For this purpose, each frame is divided into successive fragments, a plurality of which are covered by each time slot. The reference patterns are indicative of the successive fragments in each frame, respectively, and are so called merely because the patterns are representative of the reference time information.

Each frame is typically two milliseconds long. Each reference pattern may consist of G bits. It will readily be understood when G is equal to seventeen that each frame is divided into $2^{17}$ or less fragments. It is preferred for simplicity of circuitry that the reference time information generating circuit 21 be a fly wheel frame counter known in the art.

Responsive to the specific unique word detection pulse, an event occurrence detecting circuit 23 picks up one of the reference patterns of the sequence 22 as a selected pattern 24. In other words, the event occurrence detecting circuit 23 detects an instant of occurrence or appearance of the specific unique word detection pulse among the instants represented by the respective reference patterns and produces the selected pattern 24 which represents the instant of occurrence. In the manner depicted by "F/F" in the figure being referred to, the event occurrence detecting circuit 23 may comprise a flip-flop circuit responsive to the specific unique word detection pulse for latching and producing the above-mentioned one of the reference patterns as the selected pattern 24.

Each burst identifying flag of the sequence S has H bits capable of representing one of the time slots, M in number. That is, the afore-mentioned predetermined number M is equal to $2^M$ or less. Typically, H is seven or less.

A memory circuit 25 has $2^H$ or less memory cells, each depicted between two adjacent short upright lines. Each memory cell is capable of storing one of the reference patterns, namely, a pattern of G bits. It is known in the art of memory circuits that such a memory circuit is operable as follows when supplied with either a combination of an address signal and a write pulse or with the address signal alone.

The memory cells are accessible by the burst identifying flags IDm's (FIG. 2) of each frame, respectively. In other words, the burst identifying flags of the successive frames are used as the address signal. Given the specific unique word detection pulse a delay which is equal to a predetermined fraction of the above-mentioned duration of the time slots and will presently become clear, a delay circuit 26 produces a delayed unique word detection pulse 27 as the write pulse for the memory cell which is accessed by the address signal as an accessed cell. More particularly, the accessed cell is accessed by one of the burst identifying flags that identifies the time slot at which the reception burst is received.

Until renewed or rewritten by another write pulse, the memorized pattern remains in the accessed cell untouched. In other words, the memorized pattern is kept in the accessed cell unless another unique word detection pulse is produced in accordance with another burst which corresponds in one of the successively subsequent frames to the reception burst whereby the specific unique word detection pulse is duly produced in the above-described current frame.

The burst identifying flag sequence S is repeatedly used as the address signal. As soon as the accessed cell is again accessed in the next succeeding frame, the memorized pattern is produced as a read-out pattern 28. More specifically, the accessed cell is again accessed by one of the burst identifying flags that identifies, in the next succeeding frame, the time slot corresponding to the specific time slot, namely, to the time slot of reception of a burst which corresponds to the reception burst. Before renewed in the above-defined subsequent frame, the memorized pattern is repeatedly read out.

It is to be noted here that each write pulse is the unique word detection pulse given the delay. The memorized pattern is therefore produced as the read-out pattern 28 before renewed even when another write pulse is produced for the accessed cell in the next succeeding frame. It is now understood that the memory circuit 25 produces a sequence of read-out patterns after the memory calls are loaded with memorized patterns in response to the address signal and to the write pulses produced in compliance with all unique word detection pulses which are eventually produced in at least one of a plurality of frames including the freshly defined current frame.

A calculating circuit 31 is for calculating sums of the offset amount X and the reference time information represented by the respective reference patterns of the sequence 22 and for producing the sums as a sequence 32 of offset representing patterns representative of the respective sums as offset time information. It should be pointed out in this connection that the offset amount X is dependent only on the frame length L and the unique word detection window width W and is independent of the burst plan for the first through the M-th time slots. The offset amount X is therefore added to the reference time information rather than to the respective instants of actual occurrence of the unique word detection pulses of the sequence R.

A comparing circuit 33 is for comparing the read-out patterns of the sequence 28 with the offset representing patterns of the sequence 32. Each time when coincidence is found between a pattern of the sequence 28 and a pattern of the sequence 32, the comparing circuit 32 produces a receive position predicting pulse of the sequence U. The sequence U is delivered to the output terminal 13.

Figure 4:
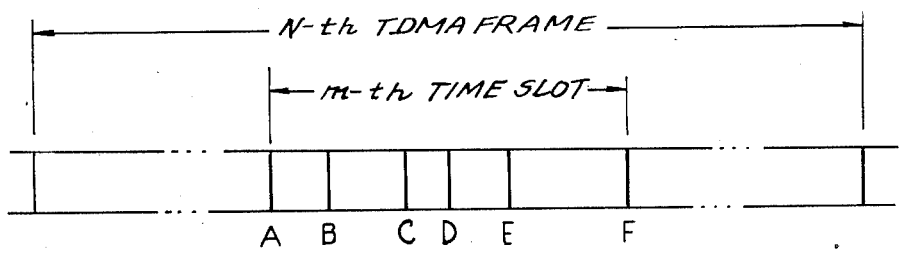
FIG. 4 shows a time slot for use in describing operation of the device illustrated in FIG. 3.

Referring to FIG. 4 in addition to FIG. 3, it will be surmised that the above-mentioned specific unique word detection pulse is produced either in the (N−1)-th frame or in a frame which precedes the (N−1)-th frame. In the N-th frame, the m-th time slot is depicted from a leading instant A through instants B, C, D, and E to a trailing instant F.

In response to the m-th burst identifying flag IDm (FIG. 2) used as the address signal, the memory circuit 25 produces the read-out pattern 28 in a leading portion between the instants A and B of the m-th time slot of the N-th frame. Incidentally, the reception bursts of the m-th time slot has a leading edge in the leading portion A to B.

The comparing circuit 33 begins comparison of the read-out pattern 28 with the offset representing patterns of the sequence 32 at the instant C. The comparing circuit 33 produces the receive position predicting pulse at the instant D upon coincidence of the read-out pattern 28 with one of the offset representing patterns. The unique word detection window for the reception burst of the m-th time slot has the starting edge at the instant C. The instant C may fluctuate in the m-th time slot, depending on the instant at which the unique word detection pulse is produced for that reception burst in one of the (N−1)-th and the preceding frames. The fact pointed out heretobefore that the reception bursts may not have exact positions along the frame, applies to the reception burst of the (N−1)-th or the preceding frame.

It is, however, possible to control the instant C so as never become earlier than the instant B. This control is periodically carried out in the known manner by the transmission control information in one of the terrestrial stations that sends the transmission burst received in the m-th time slot of the N-th frame at the earth station under consideration. In other words, the unique word detection pulse is detected in the earth station in that range of the N-th frame which has a center at a stationary instant of detection of the unique word and has a width or duration predetermined in consideration of the fluctuation in the position which the satellite has relative to the earth station and the terrestrial station in question.

The unique word detection window for the unique word which is included in the reception burst received in the m-th time slot, has the width W in each frame. This applies to the N-th frame. Only when detected in this unique word detection window, the unique word is valid.

If the unique word is detected at the instant D, the event occurrence detecting circuit 23 produces the selected pattern 24 which indicates the instant D for the N-th frame. The delay circuit 26 produces the delayed unique word detection pulse 27 as the write pulse at the instant E to substitute the selected pattern 24 as a new memorized pattern for another selected pattern produced in the (N−1)-th or the preceding frame and kept in the memory circuit 25 as a previous memorized pattern.

If the unique word is not detected in the m-th time slot of the N-th frame for some reason or another, the selected pattern of the (N−1)-th or the preceding frame remains as the memorized pattern in the memory circuit 25 as it stands. The memorized pattern is used as the read-out pattern 28 in that one of the (N+1)-th and the successively subsequent frames in which the unique word detection pulse is duly produced.

It is now appreciated that the receive position predicting device is capable of eventually producing a sequence U of receive position predicting pulses, even when at least one of the unique word detection pulses of the sequence R is not produced in a current frame, in response to the unique word detection pulses which were produced latest in the preceding frame or frames. The device is capable of dealing with the unique words, even when at least one new terrestrial station is added to the network, without addition of even a single circuit element to the device provided that the memory circuit 25 has a memory capacity of $2^H G$ bits which allows addition of the new terrestrial station or stations. Incidentally, the unique word detection positions are predicted for the respective reception bursts of each frame only within the time slots in which the reception bursts are received.

While this invention has thus far been described in specific conjunction with a preferred embodiment thereof, it will now readily be possible for one skilled in the art to develop various other embodiments of this invention. For instance, the calculating circuit 31 may be supplied with the sequence 28 of the read-out patterns instead of the sequence 22 of reference patterns. Alternatively, the calculating circuit 31 may be supplied with the sequence 24 of the selected pattern and like patterns. Such embodiments of this invention are equivalents of the device illustrated with reference to FIGS. 3 and 4. In a modification of the embodiments so far described, the reference time information generating circuit 21 may comprise a counter which is controlled by a local system clock generated in the receiving arrangement in a manner known in the art. In addition to the first through the M-th time slots, each frame may further comprise at least one additional time slot. Some of such additional time slots may have a common duration which is different from that of the above-described first through M-th time slots. The delay circuit 26 may produce the delayed unique word detection pulse 27 in one of the fragments of each frame that next follows the fragment of the instant D rather than at the illustrated instant E which may be more than several fragments after the instant D.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A receive position predicting device for use in a receiving arrangement of an earth station of a time division multiple access satellite communication network in predicting, in response to a sequence of burst identifying flags identifying those time slots repeatedly in time division multiple access frames at which bursts are received and in response to a unique word detection pulse indicative of detection of a unique word in a burst received as a reception burst in a current frame of said time division multiple access frames, a position of detection of the unique word in another burst which corresponds to said reception burst in a next succeeding frame of said time division multiple access frames, said device comprising:

reference time information generating means for generating a sequence of reference patterns representative of reference time information along each time division multiple access frame;

event occurrence detecting means coupled to said reference time information generating means and responsive to said unique word detection pulse for detecting an instant of occurrence of said unique word detection pulse to produce one of said reference patterns as a selected pattern that represents said instant;

memory means coupled to said event occurrence detecting means and responsive to said sequence of burst identifying flags used as an address signal and to said unique word detection pulse used as a write pulse for memorizing said selected pattern as a memorized pattern and responsive to the sequence of burst identifying flags of said next succeeding frame for producing said memorized pattern as a read-out pattern;

calculating means coupled to said reference time information generating means for adding an offset amount to the reference time information represented by the respective reference patterns to produce a sequence of offset representing patterns representative of offset time information; and comparing means for comparing said read-out pattern with said offset representing patterns to produce a receive position predicting pulse predictive of said position of detection when said read-out pattern is coincident with one of said offset representing patterns.

2. A receive position predicting device as claimed in claim 1, wherein said memory means comprises:

a delay circuit for giving said unique word detection pulse a delay to produce a delayed unique word detection pulse as said write pulse, said delay being equal to a predetermined fraction of a duration which each time slot has; and a memory circuit coupled to said event occurrence detecting means and having a plurality of memory cells accessible by the burst identifying flags of each time division multiple access frame, respectively, each memory cell being capable of storing one of said reference patterns, said selected pattern being memorized as said memorized pattern in response to said delayed unique word detection pulse in the memory cell accessed as an accessed cell by one of said burst identifying flags that identifies the time slot at which said reception burst is received, said accessed cell producing said memorized pattern as said read-out pattern in response to one of said burst identifying flags that identifies the time slot of reception of a burst which corresponds to said reception burst in said next succeeding frame, at least one of said plurality of memory cells not being assigned to a respective reception burst, whereby an additional earth station can be accommodated by said receive position predicting device without additional circuitry.

3. A receive position predicting device as claimed in claim 2, wherein said event occurrence detecting means comprises a flip-flop circuit responsive to said unique word detection pulse for latching and producing said one of the reference patterns as said selected pattern.

4. A receive position predicting device as claimed in claim 3, wherein said offset amount is equal to a duration of each time division multiple access frame minus a half of a duration of a unique word detection window in which the unique word of each burst should be detected.

* * * * *